(12) United States Patent
Szafraniec

(10) Patent No.: US 6,671,056 B2
(45) Date of Patent: Dec. 30, 2003

(54) METHOD AND SYSTEM FOR OPTICAL SPECTRUM ANALYSIS WITH A DEPOLARIZED LOCAL OSCILLATOR SIGNAL

(75) Inventor: Bogdan Szafraniec, Sunnyvale, CA (US)

(73) Assignee: Agilent Technologies, Inc, Palo Alto, CA (US)

( * ) Notice: Subject to any disclaimer, the term of this patent is extended or adjusted under 35 U.S.C. 154(b) by 262 days.

(21) Appl. No.: 09/759,004

(22) Filed: Jan. 11, 2001

(65) Prior Publication Data

US 2002/0122180 A1 Sep. 5, 2002

(51) Int. Cl.[7] ................................................. G02B 9/02
(52) U.S. Cl. ...................................... 356/484; 356/477
(58) Field of Search ................................ 356/477, 484; 359/192, 156

(56) References Cited

U.S. PATENT DOCUMENTS

| | | | |
|---|---|---|---|
| 4,903,342 A | * | 2/1990 | Yamazaki .................... 359/192 |
| 5,202,745 A | | 4/1993 | Sorin et al. |
| 5,903,393 A | | 5/1999 | Kalibjian |
| 6,043,921 A | | 3/2000 | Payton |

* cited by examiner

*Primary Examiner*—Samuel A. Turner
*Assistant Examiner*—Patrick Connolly (57) ABSTRACT

An optical spectrum analyzer involves a swept local oscillator signal that is depolarized before the swept local oscillator signal is combined with an input signal. An embodiment of a system for optical spectrum analysis includes a depolarizer, an optical coupler, and a heterodyne receiver. The depolarizer has an input to receive a swept local oscillator signal and an output for outputting a depolarized swept local oscillator signal. The optical coupler has a first input and a second input, the first input receiving an input signal, the second input being optically connected to the depolarizer to receive the depolarized swept local oscillator signal. The optical coupler also has an output for outputting a combined optical signal that includes the input signal and the depolarized swept local oscillator signal. The heterodyne receiver has an input for receiving the combined optical signal from the optical coupler and an output for outputting an electrical signal representative of the combined optical signal. In an embodiment, the swept local oscillator signal is depolarized such that the average polarization state of the swept local oscillator signal contains no preferential polarization state.

29 Claims, 8 Drawing Sheets

METHOD AND SYSTEM FOR OPTICAL SPECTRUM ANALYSIS WITH A DEPOLARIZED LOCAL OSCILLATOR SIGNAL

FIELD OF THE INVENTION

The invention relates generally to the field of optical measurements and measuring systems, and more particularly to a method and system for optical spectrum analysis that utilizes optical heterodyne detection.

BACKGROUND OF THE INVENTION

Dense wavelength division multiplexing (DWDM) requires optical spectrum analyzers (OSAs) that have higher spectral resolution than is typically available with current OSAs. For example, grating based OSAs and autocorrelation based OSAs encounter mechanical constraints, such as constraints on beam size and the scanning of optical path lengths, which limit the degree of resolution that can be obtained. As an alternative to grating based and autocorrelation based OSAs, optical heterodyne detection systems can be utilized to monitor DWDM systems.

Figure 1:
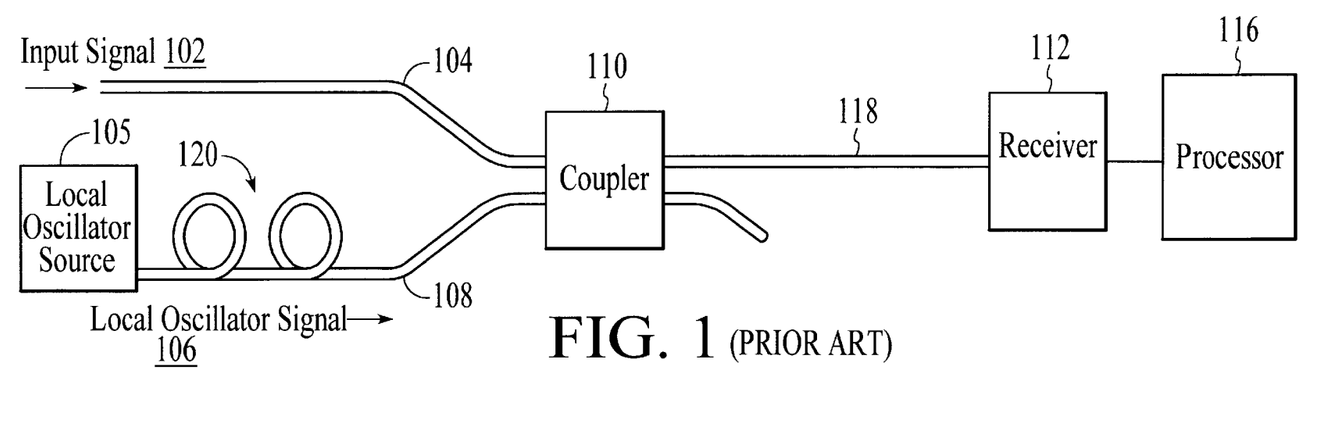
FIG. 1 is a depiction of an optical heterodyne detection system in accordance with the prior art.

Optical heterodyne detection systems are utilized for optical spectrum analysis of an input optical signal. FIG. 1 is a depiction of a prior art heterodyne-based detection system that includes an optical coupler 110 that combines an input signal 102 from an input fiber 104 with a swept local oscillator signal 106 from a local oscillator source 105 via local oscillator fiber 108. The combined optical signal travels on an output fiber 118 and is detected by a receiver 112. The square law detection results in mixing of the two combined waves and produces a heterodyne beat signal at a frequency that is equal to the frequency difference between the combined waves. The receiver converts optical radiation from the combined optical signal into an electrical signal. The electrical signal is processed by a signal processor 116 to determine a characteristic of the input signal, such as frequency, wavelength, or amplitude. In order to prevent fading of the heterodyne beat signal, it is important that the polarization states of the input signal and the swept local oscillator signal are matched. One technique for matching the polarization states of the input signal and the swept local oscillator signal involves adjusting the polarization state of the swept local oscillator signal with a polarization controller 120 to track changes in the polarization state of the input signal. A disadvantage of the polarization matching technique is that a polarization tracking system is required.

Figure 2:
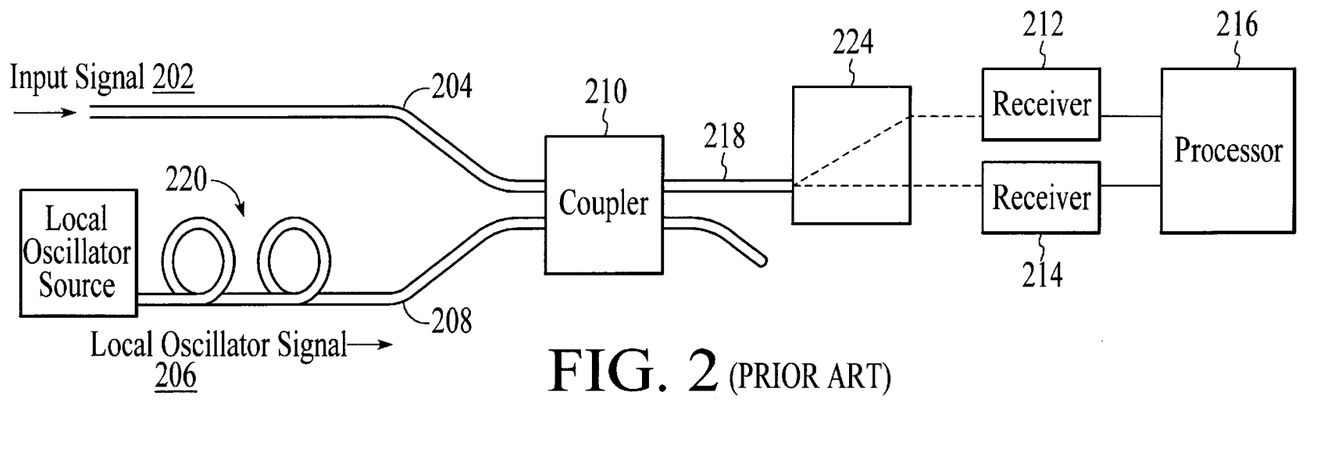
FIG. 2 is a depiction of an optical heterodyne detection system that includes a polarization diversity receiver, in accordance with the prior art.

A polarization diversity receiver can be incorporated into a heterodyne-based OSA to provide polarization independent signal detection. FIG. 2 is a depiction of a heterodyne-based OSA that incorporates a polarization diversity receiver. Throughout the specification, similar elements are identified by similar reference numerals. The heterodyne-based OSA includes a polarization controller 220 on the local oscillator fiber 208, an optical coupler 210, a polarizing beam splitter 224, two receivers 212 and 214, and a processor 216. The polarizing beam splitter splits the combined optical signal into two orthogonally polarized beams that are separately detected by the respective receivers. The power of the local oscillator signal 206 is split equally between the receivers 212 and 214 by adjusting the polarization state of the local oscillator signal. The orthogonally polarized beams that are detected by the two receivers include an intensity noise component and the heterodyne beat signal, as is known in the field of optical heterodyne detection. The strength of the heterodyne beat signal is recovered by squaring and adding the individual signals from both detectors. Although this technique works well, in order to obtain the desired dynamic range in the heterodyne-based OSA, noise subtraction is required in addition to polarization diversity. In order to accomplish noise subtraction, a balanced receiver with four detectors may be utilized, however this increases the complexity and cost of the OSA. Furthermore, the simultaneous implementation of polarization diversity and noise subtraction is possible only if the birefringence within the output leads of the coupler is nearly identical.

In view of the prior art limitations, what is needed is an optical heterodyne detection system that provides polarization independence and intensity noise suppression.

SUMMARY OF THE INVENTION

An embodiment of the invention involves an optical spectrum analyzer in which a swept local oscillator signal is depolarized before the swept local oscillator signal is combined with an input signal. Combining the depolarized swept local oscillator signal with the input signal generates a heterodyne beat signal that is used to determine the optical frequency or wavelength of the input signal. The swept local oscillator signal is depolarized in order to prevent fading of the heterodyne beat signal that is caused by changes in the polarization state of the input signal. In an embodiment, the swept local oscillator signal is depolarized such that the average polarization state of the swept local oscillator signal contains no preferential polarization state. That is, the center of gravity of all polarization states experienced by the local oscillator signal is at the center of the Poincaré sphere. Having an average polarization state at the center of the Poincaré sphere ensures that half of the power of the swept local oscillator signal always has the same polarization state as the input signal, thereby keeping the power of the heterodyne beat signal constant regardless of the input signal's polarization state.

An embodiment of a method for optical spectrum analysis that utilizes optical heterodyne detection involves providing an input signal, providing a swept local oscillator signal, depolarizing the swept local oscillator signal, combining the input signal with the depolarized swept local oscillator signal to create a combined optical signal, detecting the combined optical signal, and generating an output signal that is indicative of an optical parameter of the input signal.

In an embodiment of the method, the step of depolarizing the swept local oscillator signal includes a step of phase modulating the swept local oscillator signal. In an further embodiment, orthogonal polarization components of the swept local oscillator signal are modulated independently, resulting in polarization modulation. In a further embodiment, the polarization modulation creates a pseudo-depolarized swept local oscillator signal. In an further embodiment, the average polarization state of the pseudo-depolarized swept local oscillator signal is at the center of the Poincaré sphere. In an alternative embodiment, the average polarization state of said pseudo-depolarized swept local oscillator signal is within 20 percent of the Poincaré sphere radius from the center of the Poincaré sphere.

In another embodiment, the step of depolarizing includes birefringence modulation. In a further embodiment, the swept local oscillator signal is linearly polarized at 45 degrees with respect to the birefringent axes of a depolarizing component before being depolarized.

In another embodiment, step of depolarizing includes steps of splitting the swept local oscillator signal into at least two portions, delaying one of the at least two portions, and transforming the polarization state of one of the at least two portions such that the at least two portions have orthogonal polarization states.

An embodiment of a system for optical spectrum analysis includes a depolarizer, an optical coupler, and a heterodyne receiver. The depolarizer has an input to receive a swept local oscillator signal and an output for outputting a depolarized swept local oscillator signal. The optical coupler has a first input and a second input, the first input receiving an input signal, the second input being optically connected to the depolarizer to receive the depolarized swept local oscillator signal. The optical coupler also has an output for outputting a combined optical signal that includes the input signal and the depolarized swept local oscillator signal. The heterodyne receiver has an input for receiving the combined optical signal from the optical coupler and an output for outputting an electrical signal representative of the combined optical signal.

In an embodiment, the optical spectrum analyzer includes a processor for receiving the electrical signal from the optical receiver and generating an output signal that is indicative of an optical parameter of the input signal, wherein the processor monitors a heterodyne beat signal that is a component of the combined optical signal.

An embodiment further includes a tunable laser optically connected to the depolarizer for generating the swept local oscillator signal. In an embodiment, the depolarizer is a phase modulator. In an embodiment, the phase modulator is a birefringent phase modulator. In an embodiment, the birefringent phase modulator is a Ti-indiffused $LiNbO_3$ phase modulator. In an embodiment, the birefringent phase modulator outputs the depolarized swept local oscillator signal with an average polarization state that is at the center of the Poincaré sphere. In an embodiment, the birefringent phase modulator outputs the depolarized swept local oscillator signal with an average polarization state that is within 20 percent of the Poincaré sphere radius from the center of the Poincaré sphere.

An embodiment of the depolarizer includes a splitter for splitting the swept local oscillator signal into at least two portions, a delay for delaying one of the at least two portions, and a component for transforming the polarization state of one of the at least two portions such that the at least two portions have orthogonal polarization states.

In an embodiment, the depolarizer includes multiple depolarizers. In a further embodiment, the multiple depolarizers are cascaded.

Other aspects and advantages of the present invention will become apparent from the following detailed description, taken in conjunction with the accompanying drawings, illustrating by way of example the principles of the invention.

DETAILED DESCRIPTION OF THE INVENTION

An embodiment of the invention involves an optical spectrum analyzer in which a swept local oscillator signal is depolarized before the swept local oscillator signal is combined with an input signal. Combining the depolarized swept local oscillator signal with the input signal generates a heterodyne beat signal that is used to determine the optical frequency or wavelength of the input signal. The swept local oscillator signal is depolarized in order to prevent fading of the heterodyne beat signal that is caused by changes in the polarization state of the input signal. In an embodiment, the swept local oscillator signal is depolarized such that the average polarization state of the swept local oscillator signal contains no preferential polarization state. That is, the center of gravity of all polarization states experienced by the local oscillator signal is at the center of the Poincarésphere. Having an average polarization state at the center of the Poincaré sphere ensures that half of the power of the swept local oscillator signal always has the same polarization state as the input signal, thereby keeping the power of the heterodyne beat signal constant regardless of the input signal's polarization state.

Figure 3:
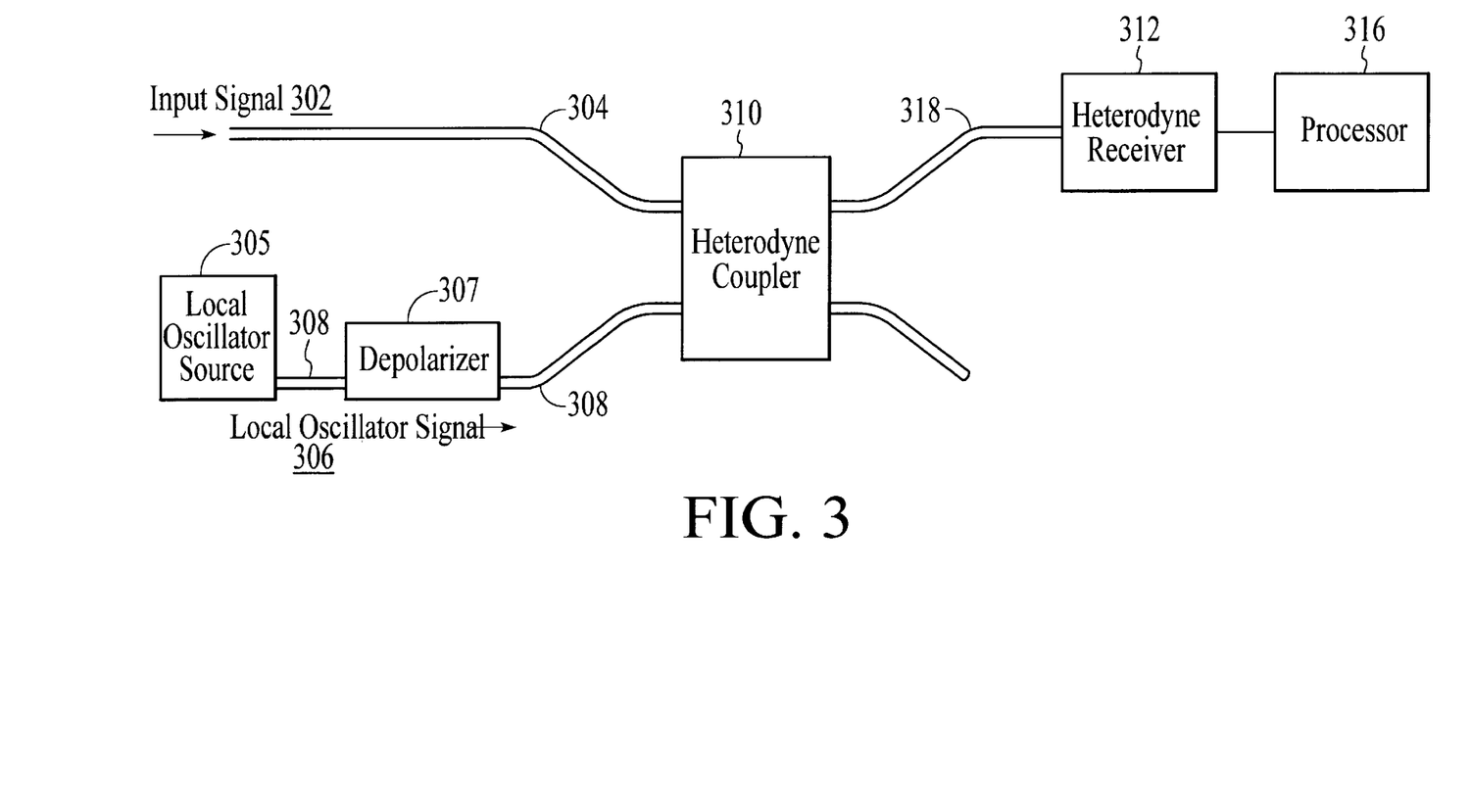
FIG. 3 is a depiction of a heterodyne-based OSA with a depolarizer for depolarizing a swept local oscillator signal in accordance with an embodiment of the invention.

FIG. 3 is a depiction of an optical spectrum analyzer in which the swept local oscillator signal is depolarized before the swept local oscillator signal is combined with an input signal. The optical spectrum analyzer includes a signal fiber 304, a local oscillator source 305, a local oscillator fiber 308, a depolarizer 307, a heterodyne coupler 310, a heterodyne receiver 312, and a processor 316. It should be noted that throughout the description, similar reference numerals are utilized to identify similar elements.

The signal fiber 304 carries an input signal that is to be detected by the system. In an embodiment, the signal fiber is a single mode optical fiber as is known in the field, although other optical waveguides may be utilized. In addition, although waveguides are described, optical signals may be input into the system, or transmitted within the system, in free space.

The input signal 302 includes optical signals that are generated from conventional devices as is known in the field of optical communications systems. For example, the input signal may be generated from a single laser or multiple lasers and may consist of a single wavelength or multiple wavelengths as is known in the field of wavelength division multiplexing. In addition to the wavelength characteristic, the input signal also has a polarization state that can be defined at any point in time. Although the polarization state of the input signal can be defined at any point in time, the polarization state of the input signal may be changing during signal transmission.

In an embodiment, the input signal 302 has unknown optical characteristics that are measured by the optical spectrum analyzer. The input signal may alternatively be an optical signal that is input with known optical characteristics, in which case the optical spectrum analyzer can be utilized for optical network analysis. In an embodiment, a known input signal may be a delayed portion of the local oscillator signal. When the optical spectrum analyzer is utilized for optical network or component analysis, the characteristics of a network or a single component can be determined by inputting a known input signal into the network or the single component and then measuring the response to the known signal.

The local oscillator source 305 generates a local oscillator signal. In an embodiment, the local oscillator source is a highly coherent wideband tunable laser that is tunable over a wavelength range of one nanometer or greater. During optical spectrum analysis, the local oscillator source generates a highly coherent local oscillator signal that is swept across a range of frequencies, or wavelengths, in order to detect the input signal over the range of frequencies or wavelengths.

The local oscillator fiber 308 is an optical fiber, such as a single mode optical fiber, that carries the local oscillator signal 306 to the depolarizer 307. Other optical waveguides may be utilized in place of single mode optical fiber, such as polarization preserving fiber. Alternatively, the local oscillator signal may be transmitted through the system in free space without the use of a waveguide.

The depolarizer 307 receives the swept local oscillator signal from the local oscillator fiber 308 and depolarizes the swept local oscillator signal. A depolarized swept local oscillator is output from the depolarizer to the heterodyne coupler 310. In an embodiment, the polarization state of the depolarized swept local oscillator signal is balanced so that half of the power of the swept local oscillator signal always has the same polarization state as the input signal, thereby keeping the power of the heterodyne beat signal constant even if the polarization state of the input signal changes. Different techniques can be utilized to depolarize the swept local oscillator signal in a balanced manner. Some example techniques are described below with reference to FIGS. 4A–12.

The heterodyne coupler 310 combines the input signal 302 and the depolarized swept local oscillator signal 306 onto a common waveguide. As shown in FIG. 3, the heterodyne coupler combines the input signal and the depolarized swept local oscillator signal and distributes the combined optical signal into an output fiber 318. Although only one output fiber is shown in FIG. 2, more than one output fiber can be utilized to transmit a portion of the combined optical signal to the heterodyne receiver 312.

The heterodyne coupler 310 may be an optically directional 3 dB fiber coupler, although other optical couplers may be utilized. In an embodiment, the optical coupler is substantially independent of the polarization of the input signal 302 and the swept local oscillator signal 306. In an embodiment, the optical coupler is a single mode coupler.

The output fiber 318 is a single mode optical fiber that carries the combined optical signal from the optical coupler 310 to the heterodyne receiver 312. Other optical waveguides may be utilized in place of the single mode optical fiber. Alternatively, the combined optical signal may be transmitted to the heterodyne receiver through free space without the use of a waveguide.

The heterodyne receiver 312 is connected to receive the combined optical signal from the optical coupler 310 and generates an electrical signal in response to the combined optical signal. Although not shown, the optical receiver may include photodetectors, signal amplifiers, and filters, as is known in the field. The electrical signal generated by the heterodyne receiver 312 is provided to the processor 316 via an electrical connection 364. As an alternative to a photodetector based optical receiver, the heterodyne receiver may utilize other detection devices, such as a non-linear mixing element.

The processor 316 includes a multifunction processor that receives the electrical signals from the heterodyne receiver 312 and isolates the heterodyne beat signal from the heterodyne receiver to generate an output signal that is indicative of an optical parameter, such as optical frequency, wavelength, or amplitude, of the input signal 302. The processor may include either or both analog signal processing circuitry and digital signal processing circuitry, as is known in the field of electrical signal processing. In an embodiment, an analog signal from the receiver is converted into a digital signal and the digital signal is subsequently processed to generate an output signal.

In operation, an input signal 302 propagates through the input fiber 304 towards the heterodyne coupler 310. Simultaneously, the swept local oscillator signal 306 generated by the local oscillator source 305 propagates through the local oscillator fiber 308 to the depolarizer 307. The depolarizer outputs a depolarized swept local oscillator signal that propagates towards the heterodyne coupler. The input signal 302 and the depolarized swept local oscillator signal 306 are combined by the heterodyne coupler into a combined optical signal. The combined optical signal is output onto output fiber 318 and transmitted to the heterodyne receiver 312. The combined optical signal is detected by the heterodyne receiver and an electrical signal is generated in response to the combined optical signal. The electrical signal is processed by the processor 316 utilizing known techniques to isolate the heterodyne beat signal that is generated from mixing the input signal with the depolarized swept local oscillator signal. The heterodyne beat signal is monitored utilizing known techniques to determine an optical parameter of the input signal, such as wavelength, frequency, or amplitude. Because the swept local oscillator signal is depolarized, the power of the heterodyne beat signal is independent of the input signal's polarization state.

That is, the power of the heterodyne beat signal stays constant even when the polarization state of the input signal is changing.

In an embodiment, the swept local oscillator signal is depolarized such that the average polarization state of the swept local oscillator signal is at the center of the Poincaré sphere. Although the average polarization state of the swept local oscillator signal is at the center of the Poincaré sphere, the actual polarization state of the swept local oscillator signal can be defined at any point in time as a particular point on the Poincaré sphere. In order to generate an average polarization state that is at the center of the Poincaré sphere, the polarization state of the swept local oscillator signal rapidly changes between points on the Poincaré sphere, creating the effect of depolarization. The depolarization achieved by rapidly changing polarization states is referred to as "pseudo-depolarization." In an embodiment, multiple polarization evolutions around the Poincaré sphere take place within the time required for the local oscillator source to sweep over the bandwidth of the heterodyne receiver. Although the average polarization state of the swept local oscillator signal is described as being at the center of the Poincaré sphere, in some embodiments, the average polarization state may be substantially at the center, or near the center, of the Poincaré sphere but not exactly at the center. In an embodiment, substantially at the center, or near the center, of the Poincaré sphere is defined as being no further away from the center than 20 percent of the radius of the Poincaré sphere.

Figure 4A:
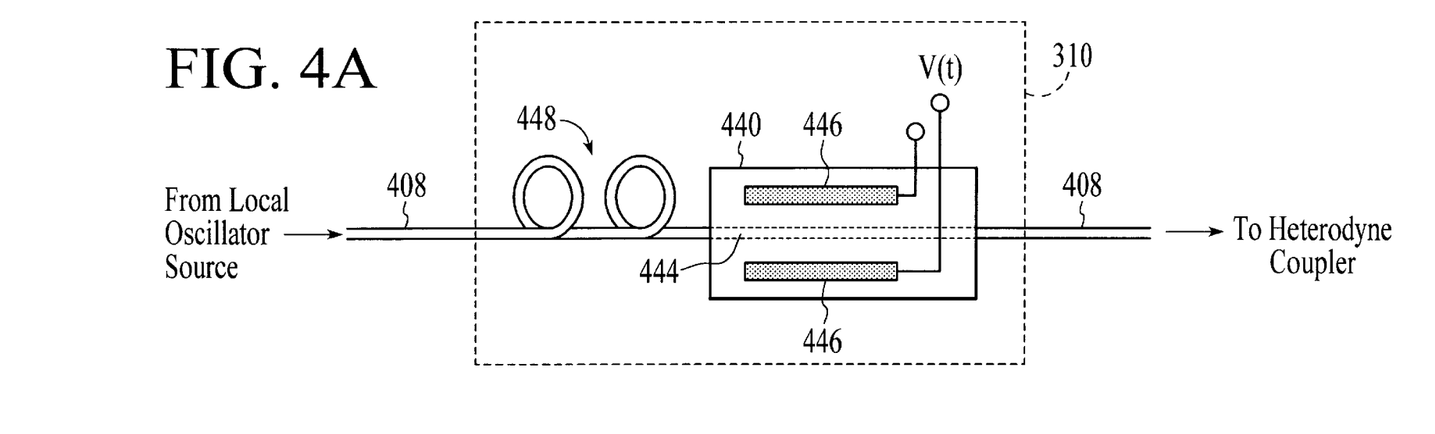
FIG. 4A depicts an embodiment of a depolarizer that includes a Ti-indiffused $LiNbO_3$ phase modulator and a polarization controller in accordance with an embodiment of the invention.
Figure 5:
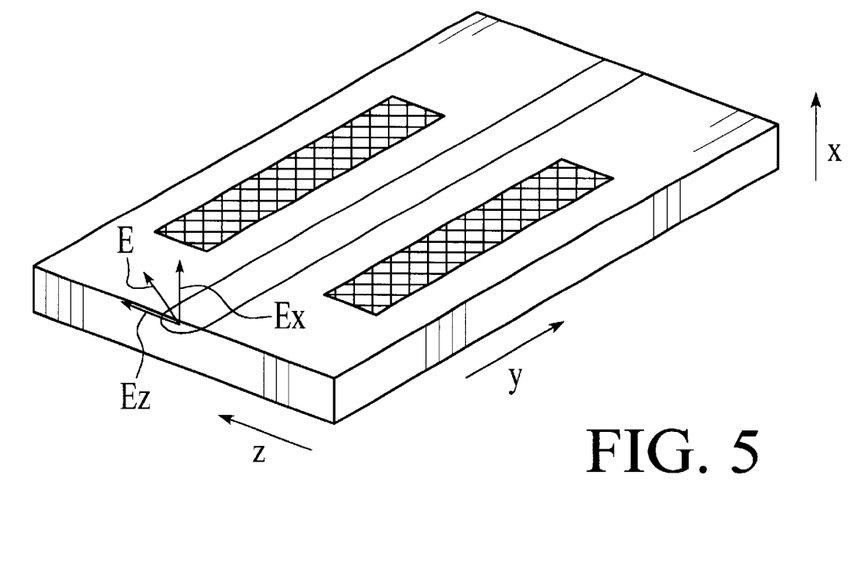
FIG. 5 is a perspective view of the depolarizer from FIG. 4A.

FIG. 4A depicts an embodiment of a depolarizer 310 that utilizes birefringence modulation to create a pseudo-depolarized swept local oscillator signal. The depolarizer includes a Ti-indiffused $LiNbO_3$ phase modulator 440 that includes a waveguide 444, two electrodes 446, a polarization controller 448, and a single mode input fiber 408. Referring to FIG. 5, a perspective view of the phase modulator, the Ti-indiffused $LiNbO_3$ phase modulator is x-cut and y-propagating, with the local oscillator signal power being split equally between the orthogonal polarization modes, i.e., $E_x=E_z$. Although an x-cut LiNbO3 phase modulator is described, other cuts, such as a z-cut phase modulator, may be used. Phase modulation in the transverse electric (TE) mode, $E_z$, wave, is proportional to the electro-optic coefficient $r_{33}$ and can be written as:

$$\Phi_a(t) \propto r_{33} \cdot V(t)$$

where, $\Phi_a(t)$=phase modulation of the signal in the TE mode; and

V(t)=voltage applied to electrodes as a function of time.

Phase modulation in the transverse magnetic (TM) mode, $E_x$, wave, is proportional to the electro-optic coefficient $r_{13}$ and can be written as:

$$\Phi_b(t) \propto r_{13} \cdot V(t)$$

where, $\Phi_b(t)$=phase of the signal in the TM mode; and

V(t)=voltage applied to electrodes as a function of time.

The electro-optic coefficients are related by $r_{33} \approx 3r_{13}$.

In an embodiment, a linearly polarized swept local oscillator signal is input into the waveguide at 45 degrees with respect to the birefringent axes of the depolarizer and the output polarization state of the swept local oscillator signal is controlled by the voltage that is applied to the electrodes of the phase modulator. In an embodiment, the modulation frequency of the phase modulation is outside of the heterodyne receiver passband. In Jones matrix notation the output wave, $e_o$, from the phase modulator is defined by:

$$e_o = \begin{bmatrix} e^{j\Phi_a(t)} & 0 \\ 0 & e^{j\Phi_b(t)} \end{bmatrix} \begin{bmatrix} \frac{1}{\sqrt{2}} & -\frac{1}{\sqrt{2}} \\ \frac{1}{\sqrt{2}} & \frac{1}{\sqrt{2}} \end{bmatrix} \begin{bmatrix} 1 \\ 0 \end{bmatrix} \cdot e^{j(\pi\gamma t^2 + 2\pi\nu_1 t)}$$

where;
 $j=\sqrt{-1}$ is an imaginary number;
 $\gamma$=the sweep rate of the local oscillator signal; and
 $\nu_1$=the initial frequency of the local oscillator signal;
where:

$$\begin{bmatrix} e^{j\Phi_a(t)} & 0 \\ 0 & e^{j\Phi_b(t)} \end{bmatrix}$$

represents the phase modulation Jones matrix with the phase modulations $\Phi_a(t)$ and $\Phi_b(t)$ being proportional to the voltage applied to the phase modulator, i.e., $\Phi_a(t)=a \cdot V(t)$ and $\Phi_b(t)=b \cdot V(t)$, where $a \approx 3b$;
where:

$$\begin{bmatrix} \frac{1}{\sqrt{2}} & -\frac{1}{\sqrt{2}} \\ \frac{1}{\sqrt{2}} & \frac{1}{\sqrt{2}} \end{bmatrix}$$

represents the 45 degree rotation of the input signal's polarization state;
where:

$$\begin{bmatrix} 1 \\ 0 \end{bmatrix}$$

represents horizontally polarized light from the local oscillator source; and
where:

$$e^{j(\pi\gamma t^2 + 2\pi\nu_1 t)}$$

represents the swept frequency of the local oscillator signal.

After matrix multiplications:

$$e_o = \frac{1}{2} e^{j(\pi\gamma t^2 + 2\pi\nu_1 t)} \cdot e^{jaV(t)} \cdot \begin{bmatrix} 1 \\ e^{jV(t)\cdot(b-a)} \end{bmatrix}$$

where:

$$\begin{bmatrix} 1 \\ e^{jV(t)\cdot(b-a)} \end{bmatrix}$$

is the Jones vector that describes the resulting polarization state of the swept local oscillator signal. The resulting polarization states of the swept local oscillator signal are located on the great circle of the Poincaré sphere containing R, L, and the ±45 degree linear polarization states.

Figure 6:
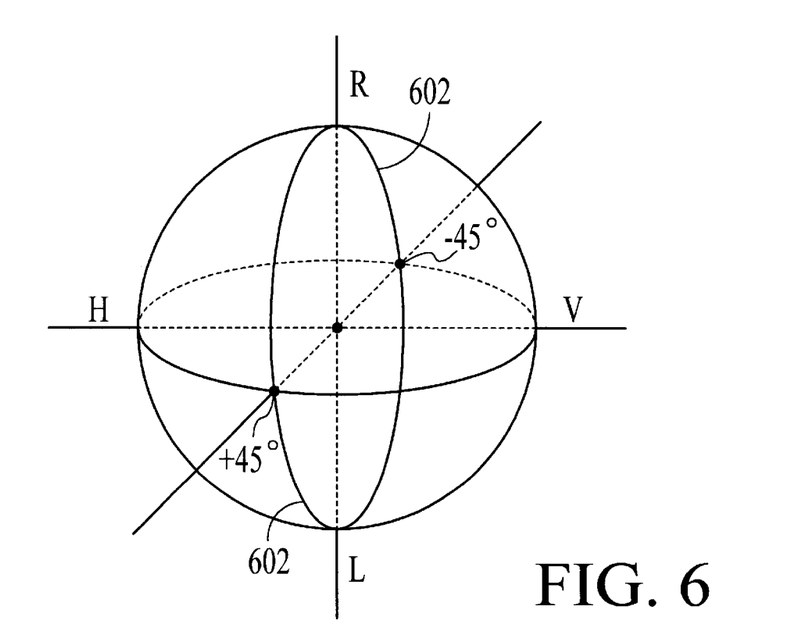
FIG. 6 is a Poincaré sphere that depicts a polarization state of the swept local oscillator signal that is on the great circle containing R, L, and ±45 degrees.

From the above described equations, the phase difference modulation function can be expressed as $\Phi(t)=(b-a) \cdot V(t)$ and a Poincaré sphere that depicts the resulting polarization states 602 of the swept local oscillator signal on the great circle containing R, L, and ±45 degrees is depicted in FIG.

6. The motion of the polarization states of the swept local oscillator signal on the great circle is controlled by the function Φ(t).

Figure 7:
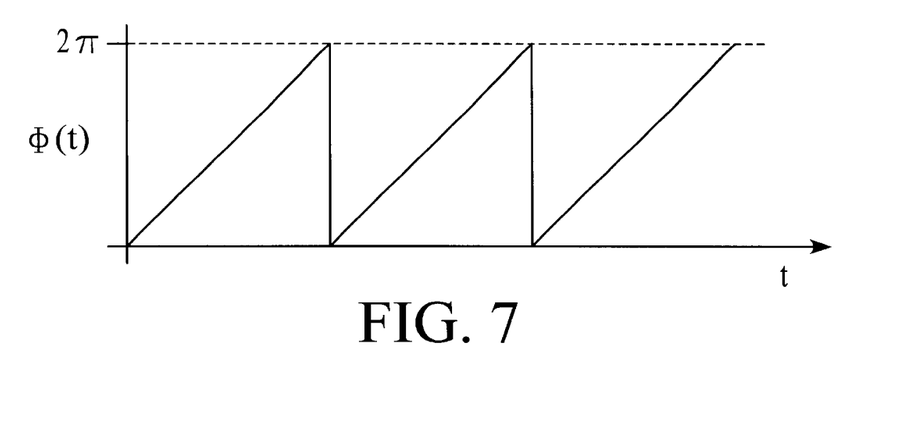
FIG. 7 depicts a phase modulation function which causes the polarization state of the swept local oscillator signal to rotate around the Poincaré sphere.

In an embodiment, the phase modulation function Φ(t) is a ramp with 2π resets as shown in FIG. 7. As shown in FIG. 6, the polarization state of the swept local oscillator signal rotates around the sphere, along the great circle containing R, L, and ±45 degrees.

Figure 8:
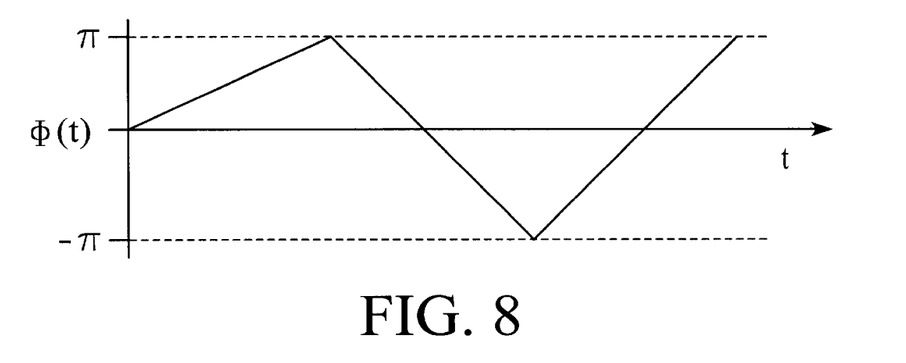
FIG. 8 depicts a phase modulation function which causes the polarization state of the swept local oscillator signal to rotate in full circle back and forth around the Poincaré sphere.

In another embodiment, the phase modulation function Φ(t) is a saw tooth function with 2π peak-to-peak amplitude changes as shown in FIG. 8. For this function, the polarization state of the swept local oscillator signal rotates full circle back and forth. That is, the polarization state makes a revolution around the great circle in one direction, then reverses and makes a revolution in the other direction.

Figure 9:
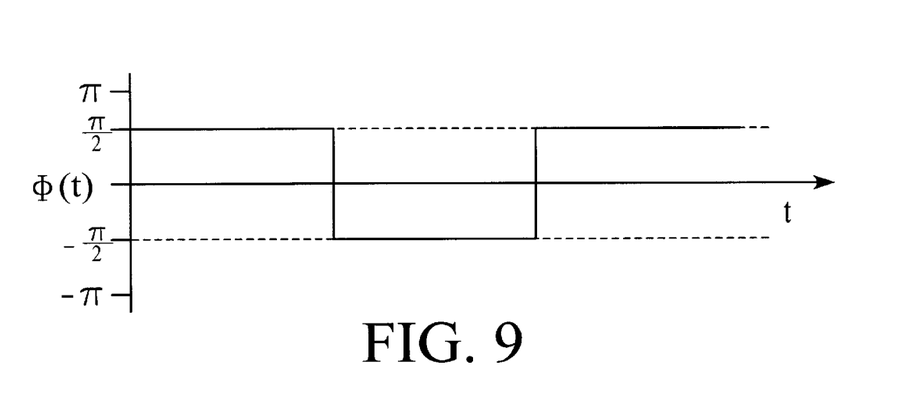
FIG. 9 depicts a phase modulation function which causes the polarization state of the swept local oscillator signal to jump back and forth between two orthogonal polarization states on the Poincaré sphere.

In another embodiment, the phase modulation function Φ(t) is a square wave with ±π/2 amplitude changes as shown in FIG. 9. For this function, the polarization state of the swept local oscillator signal jumps back and forth between two orthogonal polarization states.

In general, any phase modulation function Φ(t) which places the center of gravity of the generated polarization states in the center of the Poincaré sphere may be utilized to depolarize the swept local oscillator signal.

Figure 4B:
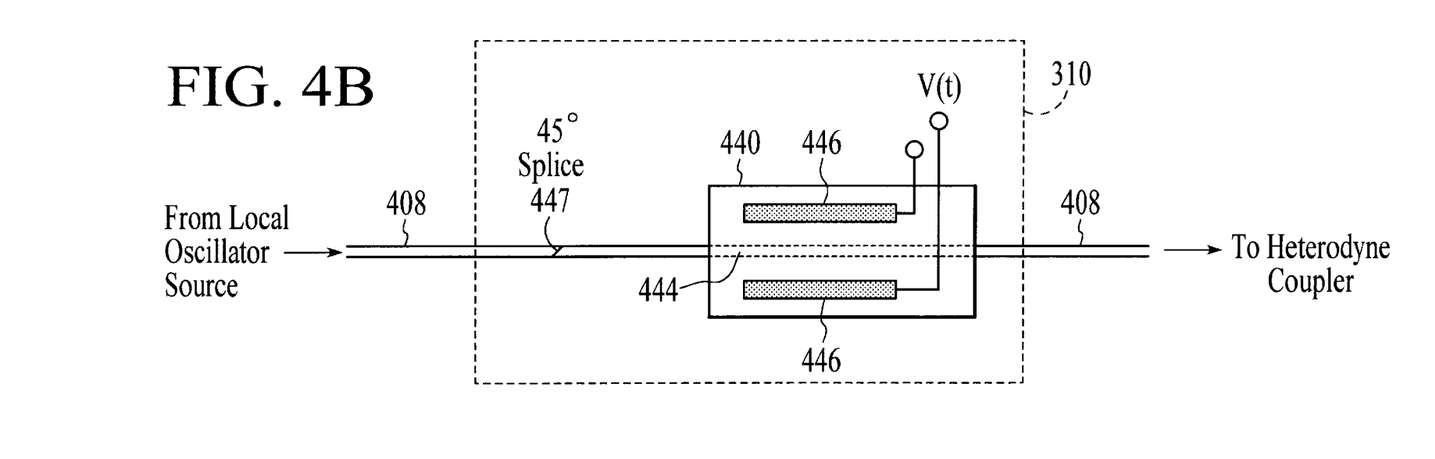
FIG. 4B depicts an embodiment of a depolarizer that includes a Ti-indiffused $LiNbO_3$ phase modulator and a 45 degree splice in accordance with an embodiment of the invention.

Referring back to FIG. 4, in an embodiment, a polarization controller 448 is located between the local oscillator source and the depolarizer. The polarization controller is used to ensure that the swept local oscillator signal has equal power in the TE and TM modes upon entering the Ti-indiffused LiNbO$_3$ phase modulator 440. In an alternative embodiment as shown in FIG. 4B, the polarization controller is replaced with a 45 degree splice 447 and the input fiber 408 is polarization maintaining fiber. The 45 degree splice and the polarization maintaining fiber can be used to equalize the power in the TE and TM modes. In either embodiment, if losses in the TE and TM modes are not equal, appropriate correction can be made by adjusting the polarization controller or the 45 degree splice.

Figure 10:
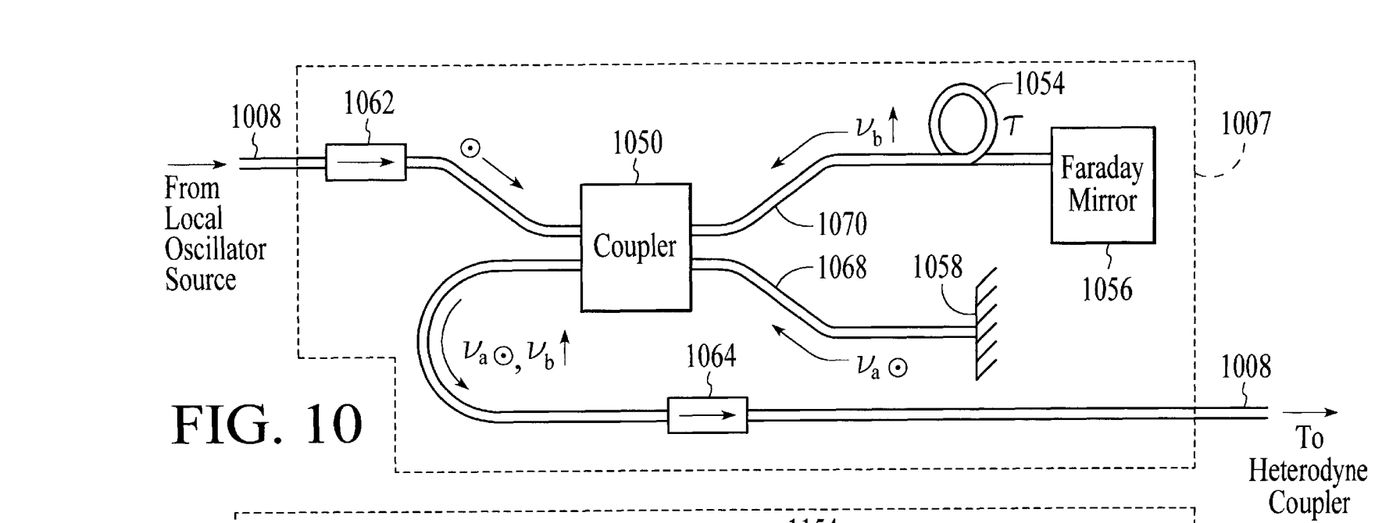
FIG. 10 depicts another embodiment of a depolarizer that includes a coupler, a delay, a Faraday mirror, a mirror, and two optical isolators.

As mentioned above, other techniques can be used to depolarize the swept local oscillator signal. FIG. 10 depicts another embodiment of a depolarizer 1007 that creates a pseudo-depolarized swept local oscillator signal. The depolarizer includes a coupler 1050, a delay 1054, a Faraday mirror 1056 which transforms the polarization state of the local oscillator signal to an orthogonal state, a mirror 1058 which maintains the linear polarization state of the local oscillator signal, and two optical isolators 1062 and 1064. In the embodiment of FIG. 10, the coupler is a polarization maintaining coupler and the delay is a fiber delay that imparts a round trip delay of τ on an optical signal.

In operation, a linear horizontal polarized swept local oscillator signal is generated by the local oscillator source (as shown in FIG. 3) and input into the depolarizer 1007. At a particular time, t, the linear horizontal polarized local oscillator signal enters the coupler 1050 at frequency $v_a$ and is split onto fibers 1068 and 1070. The portion of the signal on fiber 1068 propagates to the gold mirror 1058 and is reflected back to the coupler. Because the mirror preserves the linear polarization state of an optical signal, the optical signal in fiber 1068 maintains its linear horizontal polarization state. The portion of the signal in fiber 1070 passes through the delay 1054 to the Faraday mirror 1056 where the polarization state of the local oscillator signal is transformed, by polarization rotation, from linear horizontal to linear vertical. The linear vertical polarized local oscillator signal passes back through the delay, to the coupler. Because the local oscillator signal is swept (at rate γ) and a round trip delay of time τ has been imparted on the signal in fiber 1070, the frequency $v_b$ of the signal in fiber 1070 that combines with the signal in fiber 1068 is different than the frequency of the signal in fiber 1068. The frequency of the signal in fiber 1070 is calculated as:

$$v_b = v_a + \gamma \cdot \tau$$

The output of the depolarizer at any time comprises two linearly polarized orthogonal signals having frequencies $v_a$ and $v_b$ that differ by γ·τ. Because the local oscillator source generates a highly coherent optical signal, the combined signals from fibers 1068 and 1070 result in a defined polarization state which evolves with a frequency that is equal to the frequency difference $v_a - v_b$, thereby producing pseudo-depolarized light.

Figure 11:
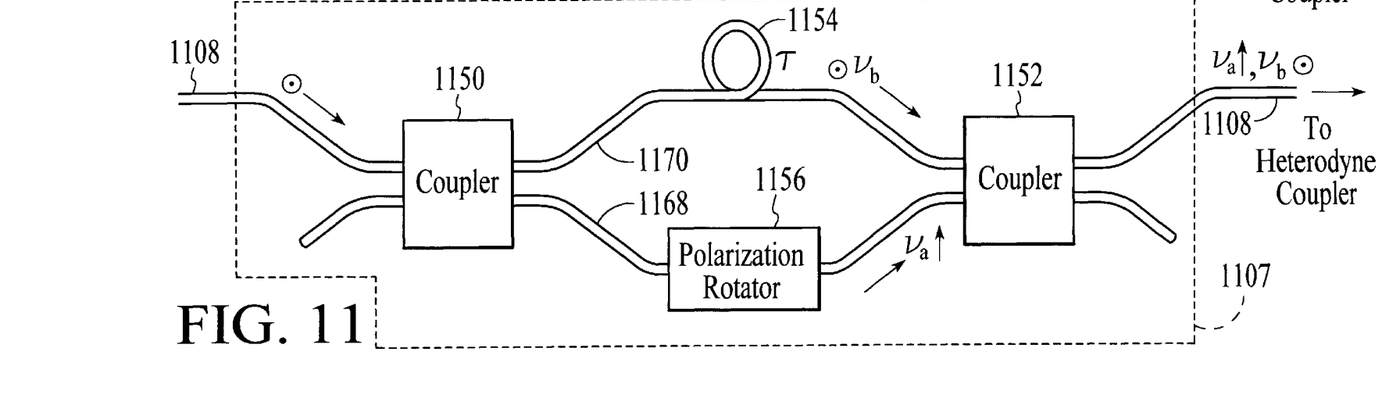
FIG. 11 depicts another embodiment of a depolarizer that includes a first coupler, a delay, a polarization rotator, and a second coupler.
Figure 12:
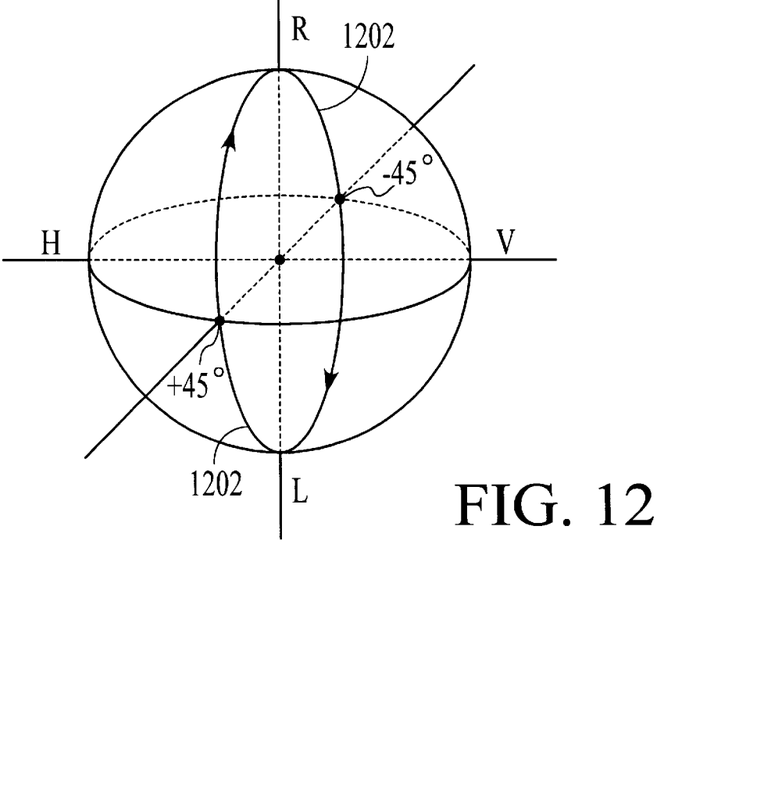
FIG. 12 is a Poincaré sphere that depicts the polarization state of a swept local oscillator signal generated from the either of the depolarizers depicted in FIGS. 11 and 12.

FIG. 11 depicts another embodiment of a depolarizer 1107 that creates a pseudo-depolarized swept local oscillator signal. The depolarizer includes a first coupler 1150, a delay 1154, a polarization rotator 1156, and a second coupler 1152. In the embodiment of FIG. 11, the first and second couplers are polarization maintaining couplers, the polarization rotator is a 90 degree rotator, and the delay is a fiber delay that imparts a single pass delay of τ on an optical signal. In the embodiment of FIG. 11, the couplers 1150 and 1152 and the fibers 1168 and 1170 are polarization maintaining.

In operation, a linear horizontal polarized swept local oscillator signal is generated by the local oscillator source and input into the depolarizer 1107. At a particular time, t, the linear horizontal polarized local oscillator signal enters the first coupler 1150 at frequency $v_a$ and is split onto fibers 1168 and 1170. The portion of the signal on fiber 1168 propagates to the polarization rotator where the linear polarization state of the signal in fiber 1168 is transformed, by a 90 degree rotation, to linear vertical for example, by a 90 splice. The linear vertical polarized local oscillator signal at frequency $v_a$ then propagates to the second coupler 1152. The portion of the signal on fiber 1170 propagates through the delay 1154, where a delay of time τ is imparted on the signal. The linear horizontal polarized local oscillator then propagates to the second coupler. Because the local oscillator signal is swept (at rate γ) and a delay of time τ has been imparted on the signal in fiber 1170, the frequency $v_b$ of the signal in fiber 1170 that combines with the signal in fiber 1168 is different than the frequency of the signal in fiber 1168. The frequency of the signal in fiber 1170 is calculated as:

$$v_b = v_a + \gamma \cdot \tau$$

The output of the depolarizer at any time is two linear orthogonally polarized signals having frequencies $v_a$ and $v_b$ that differ by γ·τ. The difference in frequency between $v_b$ and $v_a$ determines the frequency of polarization evolution. For proper detection, the polarization state must evolve several times during the time required for the local oscillator signal to sweep through the receiver bandwidth. Although the depolarizers in FIGS. 10 and 11 depict particular arrangements of couplers, delays, and polarizers, other arrangements, which accomplish the same result, may be utilized.

Referring back to the depolarizers in both FIGS. 10 and 11, the recombined waves can be described in Jones matrix notation as:

$$e_a = a_1 e^{j\Phi_a} \begin{bmatrix} 1 \\ 0 \end{bmatrix}$$

$$e_b = a_1 e^{j\Phi_b} \begin{bmatrix} 0 \\ 1 \end{bmatrix}$$

where, $$\Phi_a = \pi\gamma t^2 + 2\pi v_1 t$$

$$\Phi_b = \pi\gamma t^2 + 2\pi v_1 t + 2\pi\gamma\tau t$$

The resulting wave is described as:

$$e_o = e_a + e_b = a_1 e^{j\gamma t^2 + j2\pi v_1 t} \cdot \begin{bmatrix} 1 \\ e^{j2\pi\gamma\tau t} \end{bmatrix}$$

In an embodiment, the recombined waves, $e_a$ and $e_b$, are coherent and therefore the polarization state of the resulting wave at any point in time is always defined. However, the polarization state evolves over time without producing any preferential polarization state, thereby being depolarized on average (referred to as "pseudo-depolarized"). The evolution of the polarization state 1202 generated from the depolarizers of FIGS. 10 and 11 is illustrated on the Poincaré sphere depicted in FIG. 12. The larger the difference in the optical frequency ($v_a$ and $v_b$) between the recombined waves $e_a$ and $e_b$, the faster is the evolution of the polarization state around the sphere. A simple interpretation of the depolarized light on the Poincaré sphere is that the center of gravity of all polarization states is in the center of the sphere.

Figure 13:
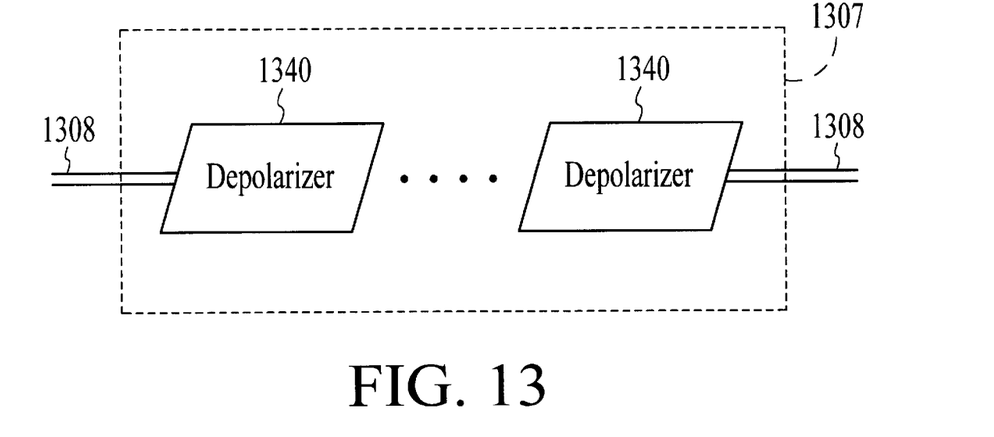
FIG. 13 depicts cascading depolarizers that are used to depolarize a swept local oscillator signal in accordance with an embodiment of the invention.

In another embodiment, a depolarizer can be realized by cascading depolarizers. For example, referring to FIG. 13, the cascading depolarizers may be Ti-iniffused LiNbO$_3$ phase modulators. In some instances, light produced by a depolarizer is not completely depolarized and contains some polarized light, i.e., the light is partially polarized. If a depolarizer is followed by another depolarizer, then the remaining fraction of the polarized light is further depolarized. Cascading depolarizers can be utilized to improve the overall depolarization.

Although the optical components of the optical heterodyne detection system are described as being connected by optical fibers, the individual devices may be integrated onto a monolithic device, such as a planar waveguide circuit. Alternatively, the optical elements may be connected by free space.

Figure 14:
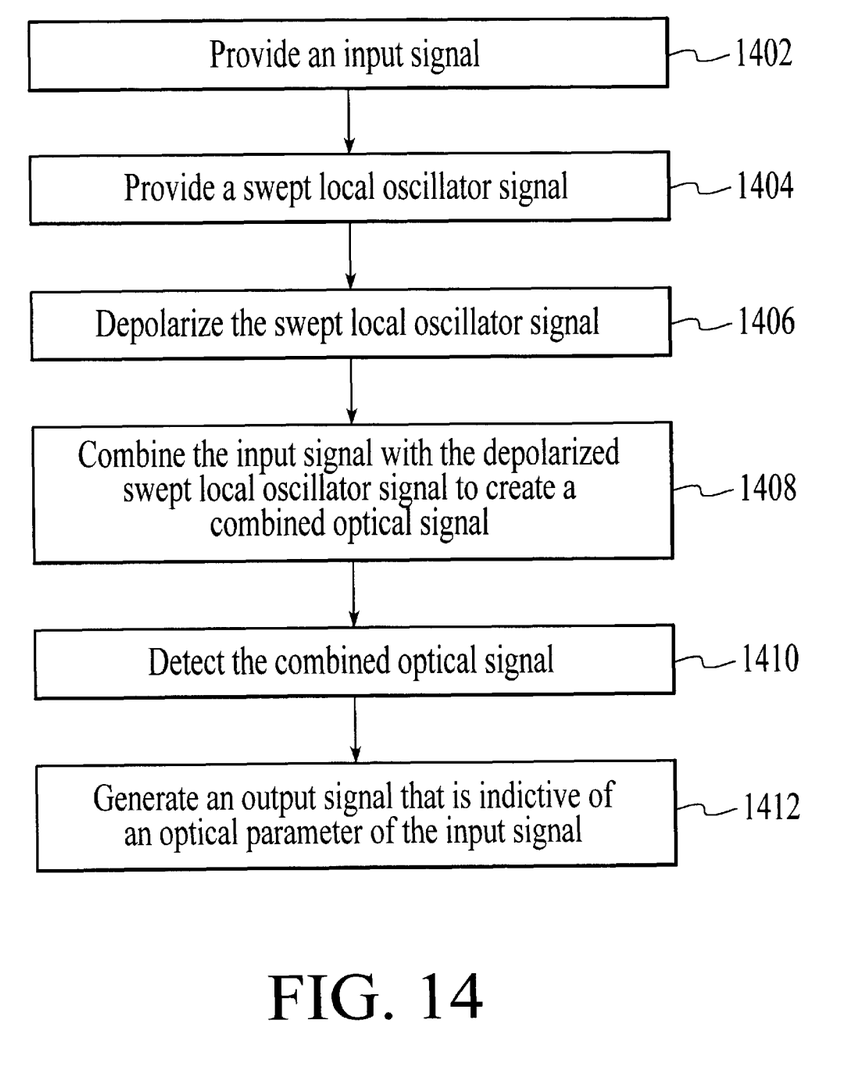
FIG. 14 is a process flow diagram of a method for optical spectrum analysis that utilizes optical heterodyne detection in accordance with an embodiment of the invention.

A process flow diagram of a method for optical spectrum analysis that utilizes optical heterodyne detection is depicted in FIG. 14. At step 1402, an input signal is provided. At step 1404, a swept local oscillator signal is provided. At step 1406, the swept local oscillator signal is depolarized. At step 1408, the input signal is combined with the depolarized swept local oscillator signal to create a combined optical signal. At step 1410, the combined optical signal is detected and at step 1412, an output signal that is indicative of an optical parameter of said input signal is generated.

What is claimed is:

1. A method for optical spectrum analysis that utilizes optical heterodyne detection comprising steps of:

providing an input signal;

providing a swept local oscillator signal;

depolarizing said swept local oscillator signal such that the average polarization state of said depolarized swept local oscillator signal is near the center of the Poincaré sphere;

combining said input signal with said depolarized swept local oscillator signal to create a combined optical signal;

detecting said combined optical signal; and generating an output signal that is indicative of an optical parameter of said input signal.

2. The method of claim 1 wherein said step of depolarizing said swept local oscillator signal includes a step of phase modulating said swept local oscillator signal.

3. The method of claim 2 wherein orthogonal polarization components of said swept local oscillator signal are modulated independently, resulting in polarization modulation.

4. The method of claim 3 wherein said polarization modulation creates a pseudo-depolarized swept local oscillator signal.

5. The method of claim 4 wherein the average polarization state of said pseudo-depolarized swept local oscillator signal is at the center of the Poincaré sphere.

6. The method of claim 4 wherein the average polarization state of said pseudo-depolarized swept local oscillator signal is within 20 percent of the Poincaré sphere radius from the center of the Poincaré sphere.

7. The method of claim 2 wherein said step of depolarizing includes birefringence modulation.

8. The method of claim 7 wherein said swept local oscillator signal is linearly polarized at 45 degrees with respect to the birefringent axes of a depolarizing component before being depolarized.

9. The method of claim 1 wherein said step of depolarizing includes steps of:

splitting said swept local oscillator signal into at least two portions;

delaying one of said at least two portions; and transforming the polarization state of one of said at least two portions such that said at least two portions have orthogonal polarization states.

10. The method of claim 9 further including a step of combining said at least two orthogonally polarized portions of said swept local oscillator signal after said steps of delaying and transforming.

11. The method of claim 1 wherein said step of generating an output signal includes a step of monitoring a heterodyne signal that is a component of said combined optical signal.

12. The method of claim 1 wherein the average polarization state of said depolarized swept local oscillator signal is within 20 percent of the Poincaré sphere radius from the center of the Poincaré sphere.

13. A method for optical spectrum analysis that utilizes optical heterodyne detection comprising steps of:

providing an input signal;

providing a swept local oscillator signal;

depolarizing said swept local oscillator signal before said input signal and said swept local oscillator signal are combined;

combining said input signal with said depolarized swept local oscillator signal to create a combined optical signal;

generating an electrical signal in response to a heterodyne beat signal that is generated from said combined optical signal; and generating an output signal from said heterodyne beat signal that is indicative of an optical parameter of said input signal;

wherein said step of depolarizing said swept local oscillator signal includes a step of phase modulating orthogonal polarization components of said swept local oscillator signal with birefringence modulation to create a pseudo-depolarized swept local oscillator signal having an average polarization state that is near the center of the Poincaré sphere.

14. The method of claim 13 wherein said step of depolarizing said swept local oscillator signal includes steps of:
splitting said swept local oscillator signal into at least two portions;
delaying one of said at least two portions; and
transforming the polarization state of one of said at least two portions such that said at least two portions have orthogonal polarization states.

15. A system for optical spectrum analysis comprising:
a depolarizer having an input to receive a swept local oscillator signal and having an output for outputting a depolarized swept local oscillator signal;
an optical coupler having a first input and a second input, said first input receiving an input signal, said second input being optically connected to said depolarizer to receive said depolarized swept local oscillator signal, said optical coupler having an output for outputting a combined optical signal that includes said input signal and said depolarized swept local oscillator signal; and
a heterodyne receiver having an input for receiving said combined optical signal from said optical coupler and an output for outputting an electrical signal representative of said combined optical signal;
wherein said depolarizer outputs said depolarized swept local oscillator signal with an average polarization state that is near the center of the Poincaré sphere.

16. The system of claim 15 further including a processor for receiving said electrical signal from said optical receiver and generating an output signal that is indicative of an optical parameter of said input signal, wherein said processor monitors a heterodyne beat signal that is a component of said combined optical signal.

17. The system of claim 15 further including a tunable laser optically connected to said depolarizer for generating said swept local oscillator signal.

18. The system of claim 15 wherein said depolarizer is a phase modulator that is configured to independently modulate orthogonal polarization components of said swept local oscillator signal.

19. The system of claim 18 wherein said phase modulator is a birefringent phase modulator.

20. The system of claim 19 wherein said birefringent phase modulator is a Ti-indiffused $LiNbO_3$ phase modulator.

21. The system of claim 19 wherein said birefringent phase modulator outputs said depolarized swept local oscillator signal with an average polarization state that is within 20 percent of the Poincaré sphere radius from the center of the Poincaré sphere.

22. The system of claim 15 wherein said depolarizer includes:
means for splitting said swept local oscillator signal into at least two portions;
means for delaying one of said at least two portions; and
means for transforming the polarization state of one of said at least two portions such that said at least two portions have orthogonal polarization states.

23. The system of claim 15 wherein said depolarizer includes multiple depolarizers.

24. The system of claim 23 wherein said multiple depolarizers are cascaded.

25. The system of claim 24 wherein said cascaded depolarizers are birefringent phase modulators.

26. The system of claim 25 wherein said birefringent phase modulators are Ti-indiffused $LiNbO_3$ phase modulators.

27. A method for optical spectrum analysis that utilizes optical heterodyne detection comprising steps of:
providing an input signal;
providing a swept local oscillator signal;
depolarizing said swept local oscillator signal;
combining said input signal with said depolarized swept local oscillator signal to create a combined optical signal;
detecting said combined optical signal; and
generating an output signal that is indicative of an optical parameter of said input signal;
wherein said step of depolarizing includes steps of:
splitting said swept local oscillator signal into at least two portions;
delaying one of said at least two portions; and
transforming the polarization state of one of said at least two portions such that said at least two portions have orthogonal polarization states.

28. A method for optical spectrum analysis that utilizes optical heterodyne detection comprising steps of:
providing an input signal;
providing a swept local oscillator signal;
depolarizing said swept local oscillator signal before said input signal and said swept local oscillator signal are combined;
combining said input signal with said depolarized swept local oscillator signal to create a combined optical signal;
generating an electrical signal in response to a heterodyne beat signal that is generated from said combined optical signal; and
generating an output signal from said heterodyne beat signal that is indicative of an optical parameter of said input signal;
wherein said step of depolarizing said swept local oscillator signal includes steps of:
splitting said swept local oscillator signal into at least two portions;
delaying one of said at least two portions; and
transforming the polarization state of one of said at least two portions such that said at least two portions have orthogonal polarization states.

29. A system for optical spectrum analysis comprising:
a depolarizer having an input to receive a swept local oscillator signal and having an output for outputting a depolarized swept local oscillator signal;
an optical coupler having a first input and a second input, said first input receiving an input signal, said second input being optically connected to said depolarizer to receive said depolarized swept local oscillator signal, said optical coupler having an output for outputting a combined optical signal that includes said input signal and said depolarized swept local oscillator signal; and
a heterodyne receiver having an input for receiving said combined optical signal from said optical coupler and an output for outputting an electrical signal representative of said combined optical signal;
wherein said depolarizer includes:
means for splitting said swept local oscillator signal into at least two portions;
means for delaying one of said at least two portions; and
means for transforming the polarization state of one of said at least two portions such that said at least two portions have orthogonal polarization states.

* * * * *